Dec. 2, 1924.
H. F. McMICHAEL ET AL
1,517,301
LIQUID HEATER
Filed Feb. 18, 1924
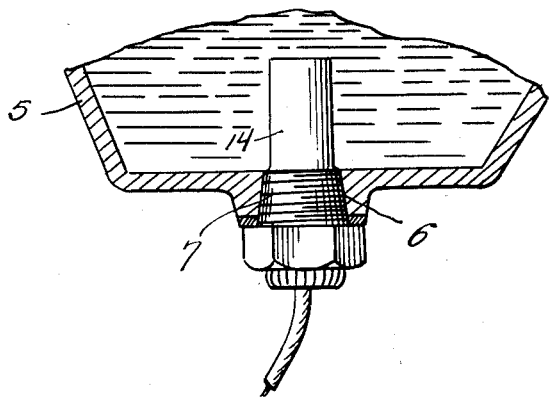
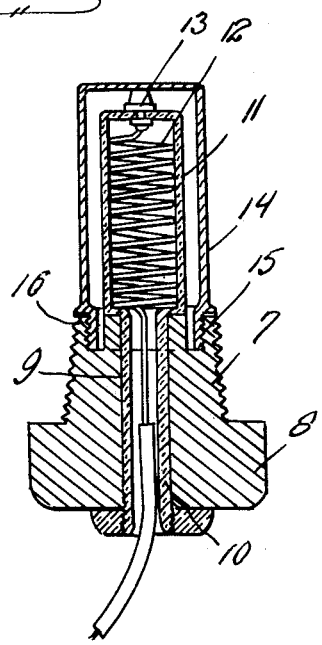
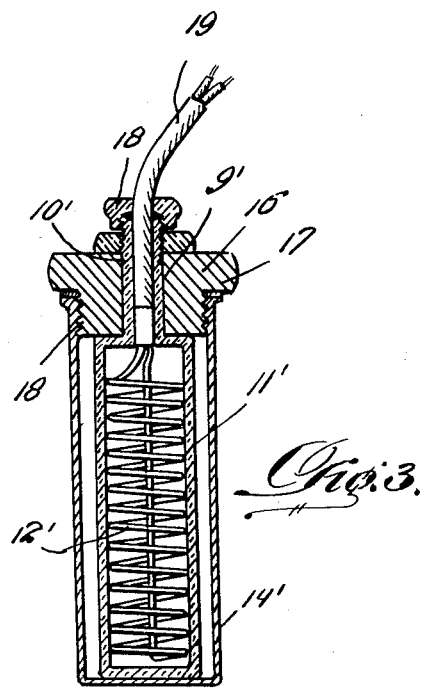
H. F. McMichael,
J. H. Lee,
Inventors
By Clarence A. O'Brien
Attorney Patented Dec. 2, 1924.

1,517,301

UNITED STATES PATENT OFFICE.

HARVEY F. McMICHAEL AND JOSH H. LEE, OF TIMPAS, COLORADO.

LIQUID HEATER.

Application filed February 18, 1924. Serial No. 693,606.

*To all whom it may concern:*

Be it known that HARVEY F. McMICHAEL and JOSH H. LEE, citizens of the United States, residing at Timpas, in the county of Otero and State of Colorado, have invented certain new and useful Improvements in Liquid Heaters, of which the following is a specification.

This invention relates to heaters for liquid and has more specific reference to an electrical heater of the emersion type whereby oil within crank cases of motor vehicles may be heated or in fact liquid within any form of containers may be heated so as to prevent the freezing or thickening of the same during cold weather.

The primary object of the invention resides in the provision of an electrical heater that may be easily disposed within an opening in the liquid container and then operated to heat the fluid therein.

An additional object of the invention is to provide a heater of the above character that may be manufactured and marketed at extremely small cost, the same comprising but few parts and these correlated in such a manner as to reduce the possibility of disarrangement to a minimum.

With the foregoing and other objects in view, as the nature of the invention will be better understood, the same comprises the novel form, combination and arrangement of parts hereinafter more fully described, shown in the accompanying drawing and claimed.

In the drawing wherein like reference characters indicate corresponding parts throughout the several views;

Figure 1 is a fragmentary sectional view through a liquid container formed with an opening within which is disposed the main form of electrical heater constructed in accordance with the present invention, Figure 2 is a detailed vertical sectional view of this form of heater per se, and Figure 3 is a view similar to Figure 2 of a slightly modified form of heater.

First having particular reference to Figures 1 and 2, 5 designates a metal container that is formed with a tapered screw threaded opening 6 and within which is adapted to be threadedly disposed either form of electrical heater constructed in accordance with the present invention.

The form of heater shown in Figure 1 embodies the provision of a metallic screw threaded tapered bushing 7 that is formed at its outer end with a hexagon shaped head 8.

This bushing 7 is provided throughout its length with a central circular shaped opening 9 within which is arranged the relatively elongated hollow neck 10 of an electric coil receiving tube 11 that is of a non-electrical conducting substance preferably procelain or the like.

Arranged within this tube 11, is an electric coil 12, one end of which is connected to a contact button 13 that extends through the closed end of said tube 11 and that is adapted for contacting with the end wall of a sheet metal protecting covering 14 of tubular shape. The other end of this protecting covering is open and is formed with a screw threaded extension 15 that is adapted to be screw threadedly disposed within an internally screw threaded socket 16 formed at the inner end of said tapered bushing 7.

In this instance, this form of heater is to be employed with a battery or the like that has one post grounded to the fluid container 5, and the other post connected to the other end of the coil 12 that extends outwardly through the neck 10 of said coil tube 11 and this preferably through the medium of a hand switch whereupon a closing of the same will complete a circuit to the coil 12 and the heat therefrom will manifestly heat the protecting covering 14 that is emerged within the fluid within the container 5 for thereby effectively heating the same.

The form of the invention shown in Figures 1 and 2 is preferably to be employed in the heating of the cylinder oil within the crank case or fly wheel casing of a vehicle engine and in this instance it is of course to be understood that the source of electric supply that is employed may be and preferably is the storage battery of the vehicle.

In the form of the invention shown in Figure 3, the same is preferably adapted to be employed for the heating of liquids in barrels and the like and in this instance, the same comprises a metal gland 16 flanged at its outer end as at 17 and externally screw threaded at its inner end as at 18. This gland 17 is also provided centrally with an open ended passage 9' through which extends the neck 10' of an electric coil receiving tube 11' which neck is screw threaded at its outer end so as to be connected to the gland 16 through the medium of a packing nut 18, which packing nut, as well as the protecting covering 11' and neck 10' is of a non-conducting material, preferably procelain or the like.

Within this tube 11' is an electric coil 12', the opposite ends of which are extended through the neck 9' of said tube and provided with insulation 19. These ends of the coil are then connected with any suitable source of electric current and the heat produced by this coil will manifestly heat the protecting covering 14' of metal that is similar in all respects to the protecting covering 14 of the form of the invention shown in Figures 1 and 2. However in this instance, the open end of this protecting covering is internally screw threaded for engagement over the external screw threads of said gland 16.

In this form of the invention, the heater is adapted to be wedged within an opening formed within a barrel or other liquid container.

It will thus be seen that we have provided two highly novel and efficient forms of electric heaters that will accomplish all of the results above attributed, and even though we have herein set forth the most practical embodiments of the invention with which we are at this time familiar, it is nevertheless to be understood that minor changes may be made in the invention without departing from the spirit and scope of the appended claims.

Having thus described our invention, what we claim as new and desire to secure by Letters Patent is:

1. An electric heater comprising a plug formed with a central bore providing a passageway, a tube of dielectric material formed with a reduced extension providing a neck, said neck extending through said passageway, the free end thereof being screw-threaded, a retaining nut connected to said screw-threaded end, a resistance coil disposed within said tube, and a protecting cylinder covering said tube and detachably connected with said plug.

2. An electric heater comprising a closing plug provided with a central bore providing a passageway, a tube of dielectric material, said tube being provided with a reduced extension forming a neck extending through said passageway, an electric resistance coil disposed within said tube, one end of the coil extending through said neck, the opposite end of said tube being provided with an opening through which the opposite end of the coil extends, a contact button connected to said last named end of the coil, and a protecting casing surrounding said tube in spaced relation, said casing being of electricity conducting material, said button being in contact therewith, said casing being detachably connected with the aforesaid plug.

In testimony whereof we affix signatures.

JOSH H. LEE.
HARVEY F. McMICHAEL.